No. 752,992.

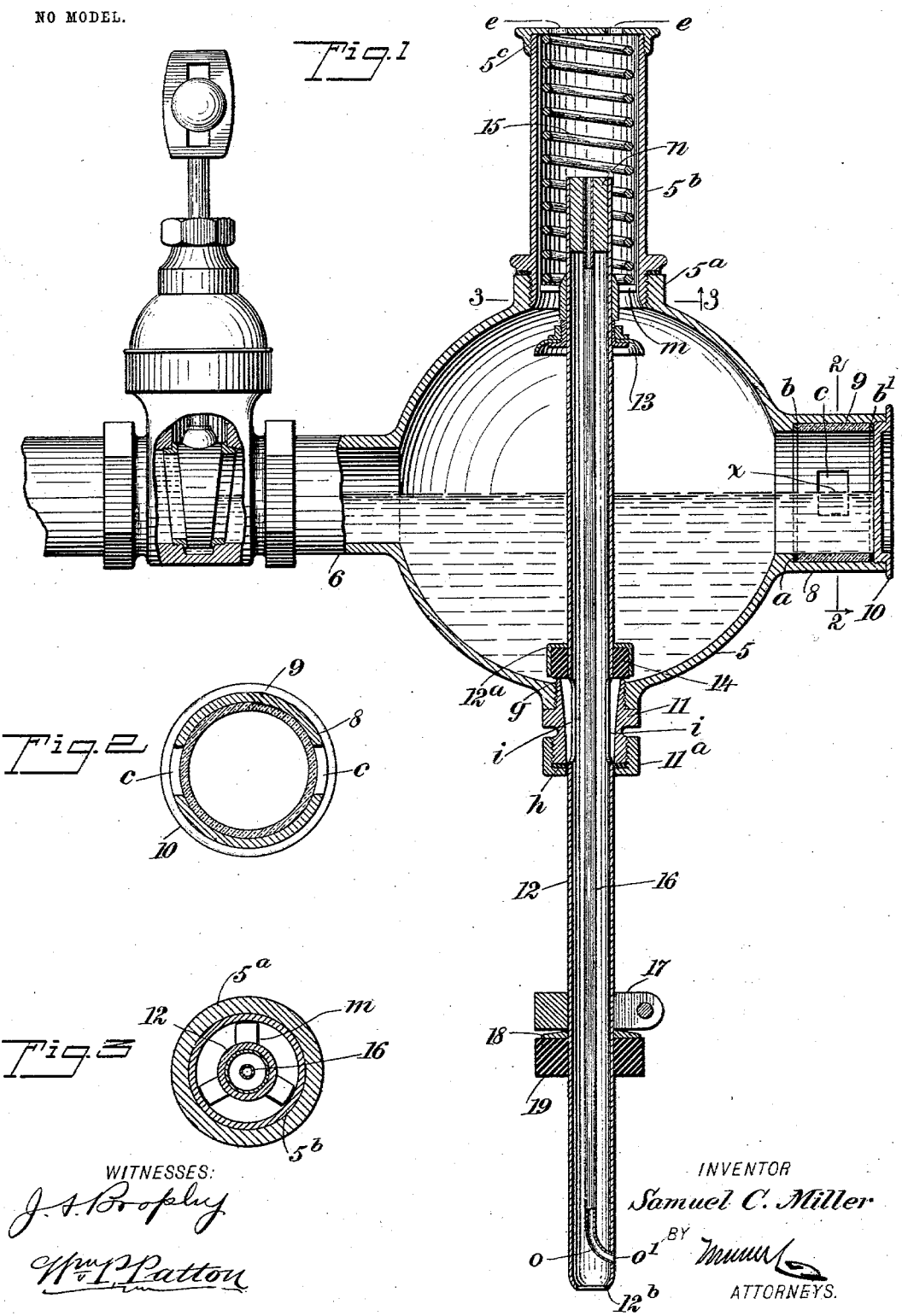

Patented February 23, 1904.

UNITED STATES PATENT OFFICE.

SAMUEL C. MILLER, OF LOUISVILLE, KENTUCKY.

BOTTLE-FILLING MACHINE.

SPECIFICATION forming part of Letters Patent No. 752,992, dated February 23, 1904.

Application filed November 7, 1902. Renewed January 14, 1904. Serial No. 189,061. (No model.)

*To all whom it may concern:*

Be it known that I, SAMUEL C. MILLER, a citizen of the United States, and a resident of Louisville, in the county of Jefferson and State of Kentucky, have invented new and useful Improvements in Bottle-Filling Machines, of which the following is a full, clear, and exact description.

This invention relates to a class of bottle-filling machines which embody a filling head or tank held to reciprocate vertically on a frame that is depressed by a treadle and raised to normal position by a weight or springs. Furthermore, the filling-head that is supplied with liquid, as required, has a plurality of spaced filling-tubes projected down from its lower side and which are inserted in the necks of bottles that are to be filled from the liquid contents of the tank, means being provided for an automatic closure of the filling-tubes when the bottles are filled. Improvements in this class of bottle-filling apparatus are shown in my Patent No. 654,016, dated July 17, 1900, and also in my Patent No. 711,781, dated October 21, 1902.

The object of my present invention is to provide a bottle-filling machine of the class indicated having novel details of construction which especially adapt it for filling bottles with a semiliquid material that does not flow freely—that is to say, condiments, such as mustard, catsup, and chile sauce, that require air pressure to enforce their passage from the tank through the filling-tubes and into bottles that are to be filled.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a sectional side view of a filling-tube embodying details of the invention and a transverse sectional view of a filling-tank, showing other features of improvement. Fig. 2 is a vertical sectional view substantially on the line 2 2 in Fig. 1, and Fig. 3 is a horizontal sectional view substantially on the line 3 3 in Fig. 1.

In the drawings, 5 indicates the filling-tank for the bottle-filling apparatus and represents a transverse section of the same at its longitudinal center, it being understood that the length of the filling-tank is proportioned to the width of the frame provided to support said tank for reciprocal movement in a vertical plane. The tank 5 in this construction is cylindrical, and at or near the center of length a tubular inlet 6 of suitable diameter is formed or secured upon the tank-wall to freely supply liquid or semiliquid material through it for partially filling the tank when it is in service.

The supply-tube 6 (shown broken away in Fig. 1) is in complete condition extended to a source of supply for the material that is to be introduced into the tank 5 and thence forced into the bottles, as will be hereinafter explained. A straightway valve 7, of any preferred style, is introduced into the supply-tube 6 and is adapted for convenient manipulation by placing it near the tank 5. On the opposite side of the tank 5 a tubular chamber 8 is formed or secured and may project from the tank-wall in an axial line with the tubular inlet 6. The wall of the chamber 8 is counterbored and at *a* forms a shoulder whereon a joint-ring *b* is seated. In the side wall of the chamber two diametrically opposite openings *c* are formed, so as to afford sight-holes that expose the interior of the chamber. A cylindrical lining-wall 9 is inserted within the counterbored portion of the chamber-wall 8, and preferably said lining is of glass having true ends, the inner end thereof seating upon the joint-ring *b*. The portion of the chamber-wall 8 that projects outside of the outer end of the lining 9 is interiorly threaded for the reception of the exteriorly-threaded rim of a sealing-cap 10, and between the inner end of said cap and the true outer end of the glass lining-wall 9 a joint-ring *b'* is introduced, which, together with the joint-ring *b*, seals the ends of the cylindrical glass lining 9, so that none of the liquid contents of the tank 5 when in service can escape from the chamber 8; but the depth of such material, as indicated at $x$, will be freely exposed through the openings $c$, as shown in Fig. 1.

Upon the upper side of the tank 5 a series of spaced openings is formed, one being shown in Fig. 1, these openings being each encircled by an interiorly-threaded collar $5^a$. In the threaded collar $5^a$ a cylindrical overflow-receptacle $5^b$ is held vertically by the threaded engagement of its lower end within the threaded collar $5^a$, and upon the upper end or the cylindrical receptacle a bonnet $5^c$ is mounted and secured, said bonnet having one or more apertures $e$ formed therein.

In the lower side of the tank 5 an opening is formed in the same vertical plane with the center of the overflow-receptacle $5^b$, the sides of the lower opening being internally threaded for the reception of a hollow plug 11, which is externally threaded and otherwise adapted for a screwed insertion in said opening. The passage through the plug 11 is coniform and is of greatest diameter at its upper end, leaving a comparatively thin annular wall at the upper edge of the plug, as shown at $g$ in Fig. 1. Upon the depending lower end of the plug 11 a cap-nut $11^a$ is screwed and has bearing upon a joint-washer $h$, that intervenes the nut and the lower end surface of the plug, which washer serves to seal the nut where it is engaged with the tubular body of the filling-tube 12.

As already explained with regard to the class of bottle-filling apparatus to which the improvements belong, a suitable number of similar filling-tubes are provided, each having slidable engagement within the tank 5 and held to convey the contents of the tank down into bottles that are to be filled.

The novel filling-tubes 12 being of like construction, but one is shown, as is also the case with regard to the plugs 11 and cap-nuts $11^a$. The tube 12 is inserted into said plug and passes down through the cap-nut $11^a$ and washer $h$, so that compression of the washer will force its inner edge against the wall of the cylindrical tube and seal the joint between the lower end of the plug 11 and the body of the filling-tube.

Two openings $i$ are formed oppositely in the wall of the tube 12, and the length of said holes longitudinally in the tube-wall does not exceed the length of the plug that normally encircles said openings. The upper end portion of the filling-tube 12 projects a proper distance into the overflow-receptacle $5^b$, and upon this portion a circular sealing-cup 13, constructed of leather or other suitable material, is held, the diameter of said cup adapting it to fit liquid-tight within the receptacle $5^b$ when the filling-tube 12 is raised sufficiently to effect this, as will be further stated in describing the operation of the device. Upon the tube 12 immediately above the openings $i$ therein an elastic sealing-ring 14 is held by its embedment in an annular box $12^a$, secured upon the tube, as represented in Fig. 1, and it will be noticed that the lower surface of the sealing-ring has contact with the thin upper edge of the plug 11 when the sealing-cup 13 is positioned a short distance below the lower end of the overflow-receptacle $5^b$, so as to leave a free passage between the tank 5 and said cup.

A three-armed cross-bar $m$ or an equivalent projection is formed or secured on the filling-tube 12 above the leather sealing-cup 13, and upon the cross-bar $m$ a spiral spring 15 is seated and has forcible engagement at its upper end with the inner surface of the bonnet $5^c$, and it will be seen that the expansion of said spring will enforce the contact of the sealing-ring 14 with the upper annular edge of the plug 11, and thus seal the passage therethrough of liquid from the tank through the coniform passage in the plug and thence through the openings $i$ into the filling-tube 12. A centrally-perforated reducer-block $n$ is affixed in the upper end of the filling-tube 12, and in the reducer-block the upper end of an air-escape pipe 16 is secured, said pipe extending down in the filling-tube 12 to a point near the lower end of the latter, and, as shown, a lateral bend $o$ is formed on the lower portion of the air-escape pipe, the extremity $o'$ of which bend passes into a perforation in the side wall of the filling-tube 12 and is therein secured air-tight. The open lower end $12^b$ of the filling-tube 12 is preferably contracted slightly to turn its edge inwardly, and thus facilitate the introduction of this end of the filling-tube into the open upper end of a bottle-neck into which the tube 12 is to conduct liquid or semiliquid material under pressure.

At a proper point between the lower end of the filling-tube 12 and the cap-nut $11^a$ a clamp 17 is adjustably secured, and below said clamp a washer 18 is positioned on the filling-tube, said washer intervening the clamp 17 and an annular sealing-block 19, of gum or other suitable material, having sufficient elasticity for effective service.

It is obvious that to enable a number of bottles to be filled at one time the number of the improved filling-tubes and adjunctive parts must be increased to suit the desired capacity of the bottle-filling machine, and as the tank 5 is held by its ends over a table mounted on the frame of the machine, as is fully exemplified in the before-mentioned patents issued to me, and said tank is adapted for vertical reciprocation the operation of the present improvements will be readily understood by the following description of the same.

As the construction of the series of filling-tubes 12 and the adjuncts of the same are similar and as they are coöperative, it is sufficient for a clear understanding of the present features of improvement and their action that the operation of the tank 5 and one filling-tube 12, together with the attached parts, be fully explained.

Assuming that a maximum supply of the semiliquid material has been introduced into the tank 5 from a source of supply under pressure by opening the valve 7, so as to fill the tank about half-full, as represented in Fig. 1, the top surface of the material being indicated by exposure of the contents through the openings $c$, this preparatory filling being effected while the tube 12 is in normal depressed adjustment, and the valve 7 subsequently closed, the filling operation is conducted as follows: The tank 5 is lowered so as to enter the lower end of the filling-tube 12 into the open neck of a bottle to be filled, while the latter is supported below the filling-tube in a suitable manner, this depression of the tube 12 causing the sealing-block 19 to impinge upon the bottle-neck and the filling-tube to be pressed upward into the overflow-receptacle $5^b$ sufficiently to enter the sealing-cup 13 into the lower portion of the overflow-receptacle $5^b$, which adjustment seals the tank 5. The upward movement of the filling-tube 12 carries the openings $i$ into the tank 5, and thus affords a free passage into and down said tube for filling the bottle wherein the tube is inserted. The valve 7 is now opened and a further supply of the semiliquid material is introduced under pressure into the tank 5, which will compress the air in the space above the liquid that was already introduced into the tank, and this compression will assist in forcing the thick liquid down into the bottle, the air passing out of the bottle up the air-escape pipe 16 and out of the orifices $e$ in the bonnet of the overflow-receptacle $5^b$. Upon completion of the filling of the bottle the valve 7 may be closed. In some cases, however, it may be of advantage to close the valve 7 before all of a series of bottles are completely filled and permit the operation to be finished by the pressure of air in the tank above the filling material.

As shown and described in my previous patents, the rise of liquid in the neck of a bottle sufficiently to cover the lower end $o'$ of the air-escape pipe will prevent a further filling of the bottle and leave space for the insertion of a cork in the top of the bottle-neck. In practice it is found that the filling-tubes 12 will not deliver the material into the bottles of a series of the latter at an exactly uniform speed, so that some of the tubes complete the filling operation before others. In this case the excess of material pressed down into the neck of a bottle that is filled to a proper height will return up the air-escape pipe 16 and overflow into the receptacle $5^b$, from which it will return into the tank 5, when the tank is elevated and the tube 12 assumes the normal position shown in Fig. 1.

Having thus fully described my invention, I claim as new and desire to secure by Letters Patent—

1. The combination with a supply-tank containing a liquid, an overflow-chamber communicating with said tank, a filling-tube movable in the tank, a valve on the tube adapted to close the communication between the overflow-chamber and the supply-tank, and means for introducing liquid matter in the tank after the valve has closed communication between the chamber and the tank whereby to cause a portion of the liquid in the tank to be forced through the filling-tube, substantially as set forth.

2. The combination with a filling-tank containing a liquid, of an overflow-chamber communicating with the tank, a valve closing the communication between the tank and the chamber, means for admitting a liquid into the tank while the valve is closed to force a portion of the liquid already in said tank therefrom, and means for permitting the return of the overflow liquid into the tank, substantially as set forth.

3. The combination with a filling-tank, and a valve-controlled supply-pipe communicating with one side of the tank, of a sight-chamber extending from the opposite side of the tank near its diametrical center and communicating therewith, said chamber having a transparent lining and the side wall of the chamber having an opening therein through which a part of the lining is exposed, thereby to show the height of liquid held within the tank and chamber, the outer end of said lining terminating short of the outer end of the chamber, a seal, and a cap closing said outer end of the chamber, said seal being confined in place between the outer end of the lining and the inner end of said cap.

4. The combination with a filling-tank and means for introducing liquid therein under pressure, of a horizontal chamber extended at one side of the tank opposite its vertical center and opening therein, said chamber having an apertured side wall, a transparent lining, sealing-joints at the ends of the lining, and sealing-cap screwing on the outer end of the chamber for its closure.

5. The combination with a filling-tank, and means for introducing material into the tank, of an overflow-receptacle on the upper side of the tank, a spring-pressed filling-tube to receive liquid from the tank, and a valve on the filling-tube, adapted to close the lower end of the overflow-receptacle when the tank is lowered and the filling-tube slides upward.

6. The combination with a filling-tank and a valve-controlled supply-pipe therefor, of an overflow-receptacle on the upper side of the tank, a spring-pressed filling-tube that receives liquid from the tank, and an adjustable cup-valve mounted upon the filling-tube below an opening in the overflow-receptacle, closing said opening when the tank is lowered and the filling-tube slides upward.

7. In an apparatus of the character described, the combination with a filling-tank, of a hollow plug screwed into an opening in the lower side of the tank, said plug being conical or tapered for its full height interiorly, forming a thin annular upper edge thereto, the lower part of the plug being threaded exteriorly and having thereon a cap-nut containing a joint-washer, a spring-pressed filling-tube having apertures in its sides, and passing through the plug, and a sealing device carried by the filling-tube and normally seated upon said upper edge of the plug, substantially as shown and for the purpose described.

In testimony whereof I have signed my name to this specification in the presence of two subscribing witnesses.

SAMUEL C. MILLER.

Witnesses:
 LOUIS H. FRANCKE,
 J. A. HAMMER.